(12) United States Patent
Nagata

(10) Patent No.: US 6,289,119 B1
(45) Date of Patent: Sep. 11, 2001

(54) IMAGE READING METHOD CAPABLE OF AUTOMATICALLY ADJUSTING IMAGE READ CONDITIONS AND IMAGE READ APPARATUS ADOPTING THE METHOD

(75) Inventor: Toru Nagata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/076,167

(22) Filed: Jan. 27, 1998

(30) Foreign Application Priority Data

Jan. 31, 1997 (JP) .................................................. 9-018672

(51) Int. Cl.⁷ .................................................. G06K 9/00
(52) U.S. Cl. .................................................. 382/162
(58) Field of Search .................................. 382/164, 168, 382/175, 162, 163, 165; 358/515, 518, 523, 474, 509, 475, 485

(56) References Cited

U.S. PATENT DOCUMENTS

| | | | |
|---|---|---|---|
| 4,926,251 | * 5/1990 | Sekizawa et al. | ................ 358/75 |
| 5,014,332 | 5/1991 | Nakajima et al. | . |
| 5,018,008 | * 5/1991 | Asada | ...................................... 358/78 |
| 5,070,367 | * 12/1991 | Sugano et al. | ........................ 355/326 |
| 5,420,694 | * 5/1995 | Matsumoto | ........................... 358/462 |
| 5,684,601 | * 11/1997 | Endo | .................................... 358/298 |

FOREIGN PATENT DOCUMENTS 0 488 176   6/1992   (EP) .
0 557 003   8/1993   (EP) .

* cited by examiner

Primary Examiner—Andrew W. Johns
Assistant Examiner—Seyed Azarian
(74) Attorney, Agent, or Firm—Henderson & Finnegan, L.L.P.

(57) ABSTRACT

An original image is pre-scanned, then scanning conditions to be used in main scanning are determined on the basis of obtained data in the pre-scanning. First, an original image is pre-scanned, and the obtained image signal is separated into color component signals. Thereafter, maximum values of the color component signals are detected for the respective colors. Further, the detected maximum values are analyzed to determine a type of the original image. After scanning conditions to be used in the main scanning are set on the basis of the type of the original image, the main scanning is performed.

34 Claims, 13 Drawing Sheets

FIG. 7
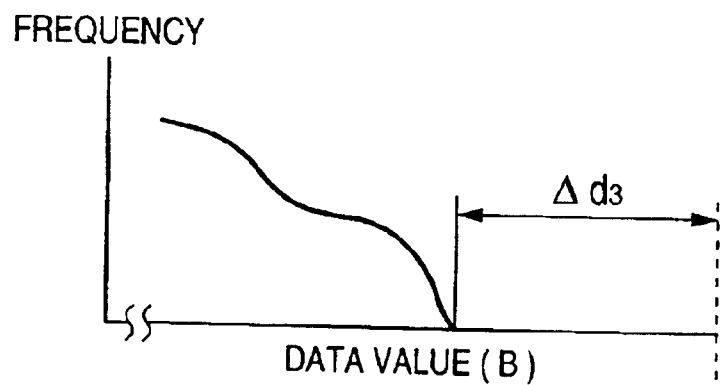
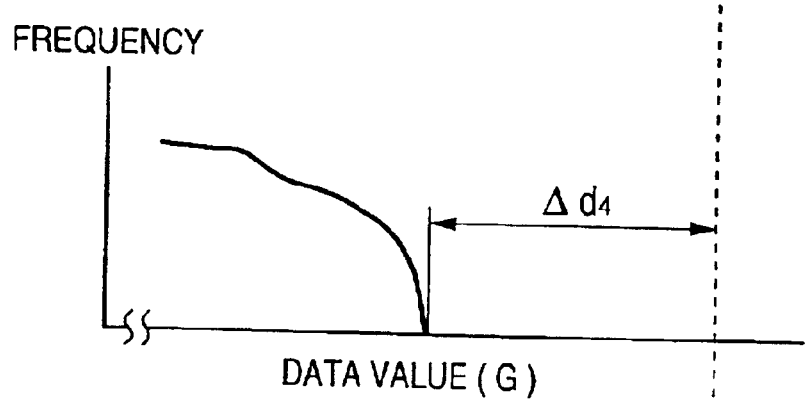
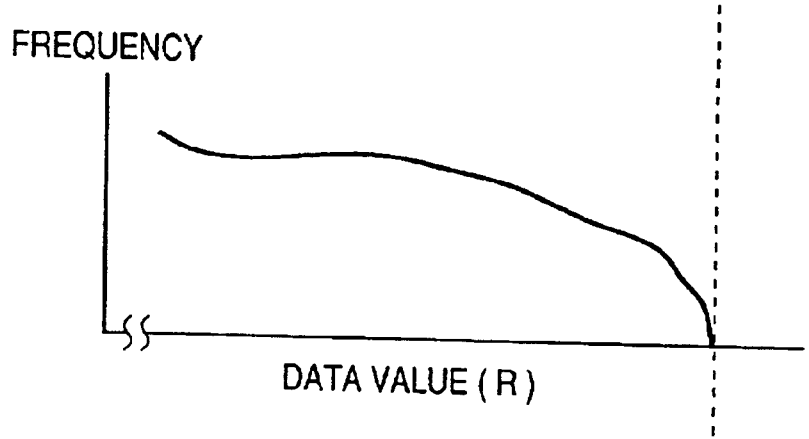

FIG. 8
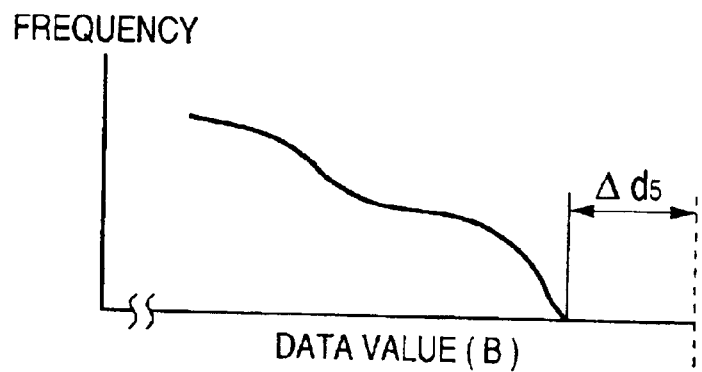
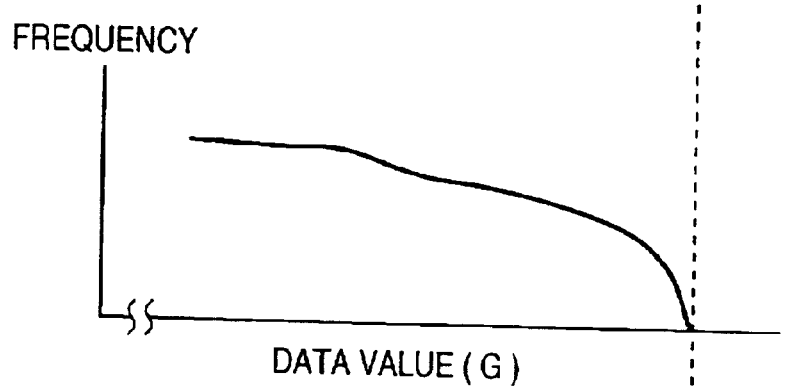
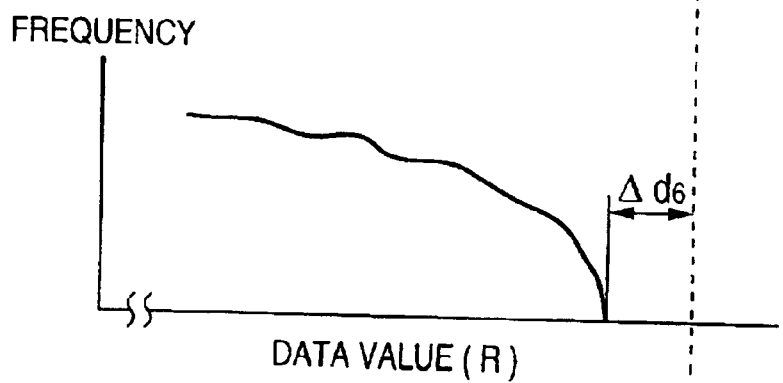

F I G. 11A
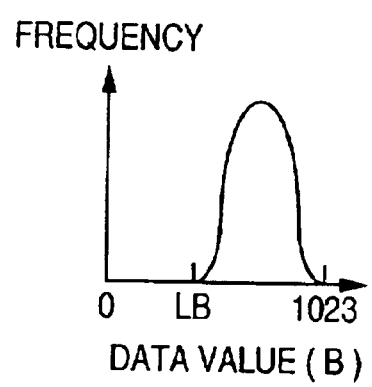
F I G. 11B
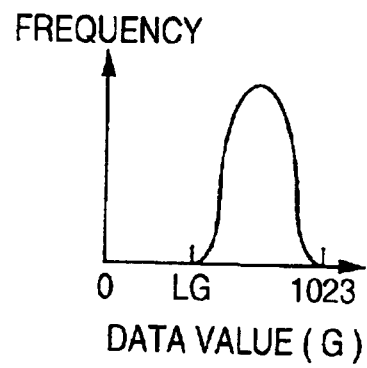
F I G. 11C
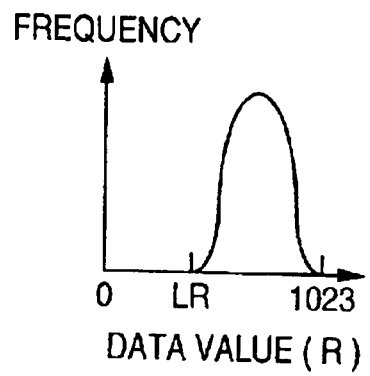

IMAGE READING METHOD CAPABLE OF AUTOMATICALLY ADJUSTING IMAGE READ CONDITIONS AND IMAGE READ APPARATUS ADOPTING THE METHOD

BACKGROUND OF THE INVENTION

The present invention relates to a method for adjusting signal levels of image signals and image read apparatus adopting the method and, more particularly, to a method, in which light reflected from or transmitted through an original image are separated into color components, for automatically adjusting conditions for reading the original image depending upon the type of the original image so that the original image is properly expressed by image signals within a predetermined signal level range and an image read apparatus, such as an image scanner, adopting the method.

When adjusting image data of an original image inputted by a scanner so as to be within a signal level range which can be expressed on hard copies, a method of generating tone histograms of the image data and determining the proper signal level range by analyzing the histograms is generally used (Summary of the Digital Photo Print System "Frontier", Material for The 4th Camera Technology Seminar in Meeting of Japan Photograph Society, pp. 13–16).

The most fundamental technique of the method is to convert the distribution of the obtained histogram into a balanced distribution as disclosed in the U.S. Pat. No. 4,745,465. Further, in the U.S. Pat. No. 4,639,769, means for expressing an image in good contrast by changing mapping of each pixel data based on a histogram is disclosed.

Further, in a case of separating a color image into primary color components to generate digital data, by performing the aforesaid conversion of distribution on each of the color components, color bias of the original image, e.g., color cast in a color photograph, taken under fluorescent light, other than daylight, is compensated, thereby a final image is expressed in a desired contrast.

However, in the aforesaid conventional method, the signal level range is determined without considering characteristics of an original image. Furthermore, whether an imbalance in tone and color of the separated color components is due to color cast of the color image to be corrected, caused by light source other than daylight, or due to the original colors, of an object of the image, which are not to be corrected is not distinguished for determining the signal level range.

Accordingly, in a case where vivid colors fill most of the original image, a problem in which vividness of the colors is easily lost arises. Further, when the colors of the original image are biased, a phenomenon, called subjective color failure, occurs.

SUMMARY OF THE INVENTION

The present invention has been made in consideration of the above situation, and has as its object to provide a method capable of determining whether the imbalance in tone and color of an original image is to be corrected or not, and, by determining conditions for scanning the original image, compensating the imbalance in tone and color, when necessary and properly expressing the original image by image signals within a predetermined signal level range, and an image read apparatus adopting the method.

According to the present invention, the foregoing object is attained by providing an image read method comprising: a pre-scanning step of pre-scanning an original image and outputting an image signal; a color separation step of separating the image signal obtained in the pre-scanning step into primary color component signals; a type determination step for determining a type of the original image on the basis of signal levels of the color component signals obtained in the color separation step; and a condition determination step of determining scanning conditions for main scanning operation on the basis of the type of the original image determined in the type determination step.

Further, the foregoing object is also attained by providing An image read system comprising: image read means for scanning an original image and outputting an image signal; color separation means for separating the image signal obtained by the pre-scanning means into color component signals; type determination means for determining a type of the original image on the basis of signal levels of the color component signals obtained by the color separation means; and condition determination means for determining scanning conditions for main scanning operation on the basis of the type of the original image determined by the type determination means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is an enlarged view of right edges of histograms of an image, photographed under daylight, which does not include a white portion;

FIG. 8 is an enlarged view of right edges of histograms of an image which is photographed under fluorescent light;

FIGS. 11A to 11C are histograms of output data from the A/D converter obtained in the main scanning operation;

DETAILED DESCRIPTION OF THE PREFERRED EMBODIMENTS

Preferred embodiments of the present invention will be described in detail in accordance with the accompanying drawings.

First Embodiment

Figure 1:
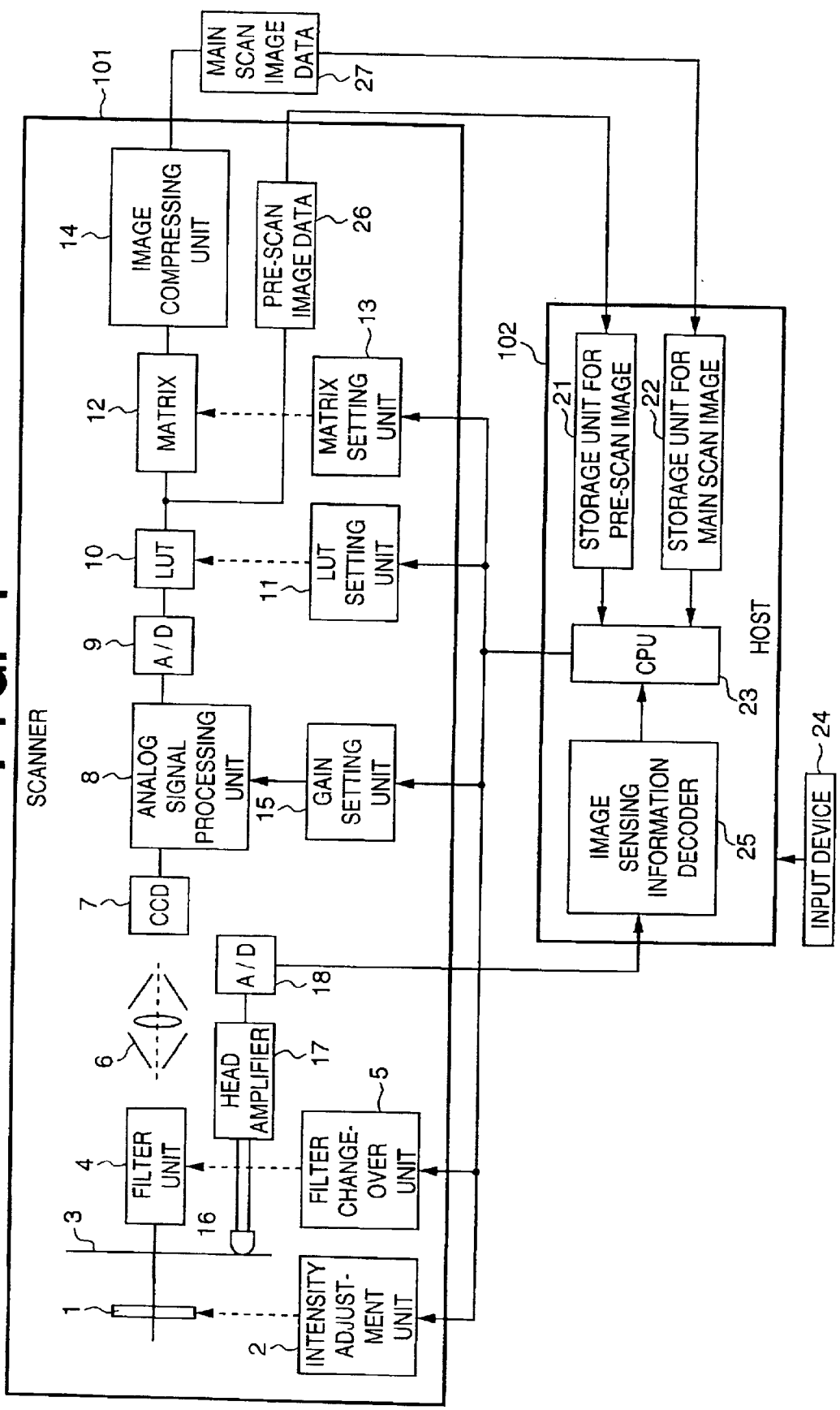
FIG. 1 is a block diagram illustrating a configuration of an image scanning system according to a first embodiment of the present invention.

FIG. 1 is a block diagram illustrating a configuration of an image scanning system comprising a scanner 101 having color separation function and a host device 102, such as a host computer according to a first embodiment of the present invention.

Referring to FIG. 1, reference numeral 1 denotes a light source for illuminating an original image. The intensity of the light can be changed by controlling the light source 1 by an intensity adjustment unit 2. Further, reference numeral 3 denotes an original image, such as a negative film and a positive film; 4, a filter unit to which an Neutral Density filter for adjusting the intensity of light which incidents on a CCD (charge coupled device) 7 is provided; 5, a filter change-over unit; and 6, a lens group which focuses the light transmitted through the original image 3.

Further, reference numeral 7 denotes the CCD (photoelectric conversion elements) for converting the light transmitted through the lens group 6 into electric signals; 8, an analog signal processing unit for electrically off-setting and amplifying the electric signals obtained from the CCD 7; 9, an analog-digital (A/D) converter for converting the analog signals from the analog signal processing unit 8 into digital signals; 10, a digital signal converter for converting the digital signals outputted from the A/D converter 9 into digital signals of another format using tables (look-up tables, the digital signal converter 10 is referred to as "LUT 10" hereinafter); and 11, a look-up table (LUT) setting unit for setting look-up tables in the LUT 10.

Reference numeral 12 denotes a color space conversion matrix circuit; 13, a matrix setting unit for setting the matrix to the color space conversion matrix circuit 12; 14, an image compressing unit for compressing the image; 15, a gain setting unit for electrically setting a gain used in the analog signal processing unit 8 in accordance with an instruction from the host computer 102; 16, a magnetic head for reading digital image sensing information recorded on a transparent magnetic layer which is applied on the original image 3; 17, a head amplifier for amplifying the output from the magnetic head 16; and 18, an analog digital (A/D) converter for converting the analog signals outputted from the head amplifier 17 into digital signals.

Reference numerals 21 and 22 are storage units for storing a pre-scan image 26 and a main scan image 27, respectively; 23, a CPU for controlling respective units; 24, an input device; and 25, an image sensing information decoder for decoding the digital signals transmitted from the scanner 101 to obtain the recorded image sensing information.

Figure 2:
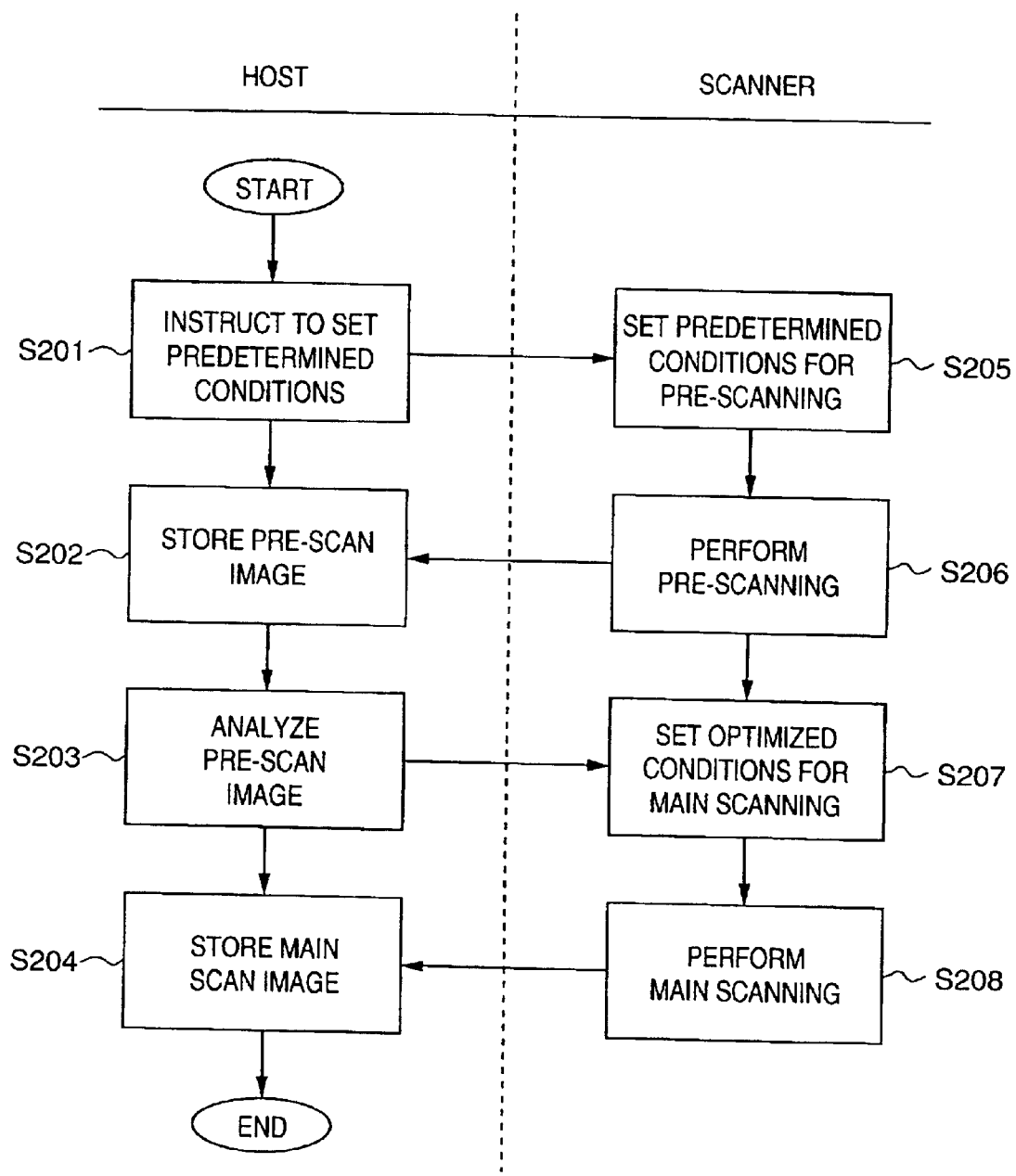
FIG. 2 is a flowchart of scanning processing according to the first embodiment of the present invention.

Next, overall scanning processing performed by the image scanning system as described above is briefly explained with reference to FIG. 2. The scanning processing is initiated in response to a scanning instruction designated by a user.

First, the user inputs the type of the film (either negative or positive) to be scanned through the input device 24. In turn, in step S201 in FIG. 2, the host device 102 instructs the scanner 101 to set predetermined conditions corresponding to the inputted film type for pre-scanning, and the scanner 101 sets the instructed predetermined conditions in step S205. The conditions to be set at this point are predetermined for respective film types, and the intensity adjustment unit 2, the filter change-over unit 5, and the gain in the analog signal processing unit 8 are controlled, further, tables, including one for negative-positive conversion, are set in the LUT 10 by the LUT setting unit 11 in accordance with the instructed conditions so that various images recorded on the film, namely, the entire density range of the film, are represented by image signals which are within a predetermined signal level range.

In step S206, the pre-scanning is performed in a lower resolution than the resolution to be used in the main scanning. Then, analog signals representing the original image 3 obtained under the set predetermined conditions are converted into digital signals by the A/D converter 9, further converted into digital signals of another format by the LUT 10. Then, the pre-scan image obtained as above is stored in the storage unit 21 for pre-scan image in step S202.

Thereafter, the CPU 23 generates a histogram on the density of the input pre-scan image, and analyzes characteristics, such as an average signal level and distribution of signal levels, of the pre-scan image in step S203. Then, the host device 102 controls in step S207, the intensity adjustment unit 2, the filter change-over unit 5, the LUT setting unit 11, and the matrix setting unit 13 on the basis of the determination results so that the optimum intensity of light, the optimum filter, the optimum tables, and the optimum color space conversion matrix are set for the main scanning.

Next, the main scanning is performed, in step S208, under the conditions set as above for main scanning. In the main scanning, processes where the light transmitted through the filter is converted into electric signals by the CCD 7, and further converted into digital signals are the same as those performed in the pre-scanning. The digital image signals are further converted using the LUT 10 which is newly set for the main scanning operation, then processed by the color space conversion matrix circuit 12 and compressed by the image compression unit 14. Finally, the compressed image signals are stored in the storage unit 22 for main scan image in step S204.

In a case where the original image 3 is a positive film, since the latitude of the positive film is narrow, a scene is usually photographed using a carefully controlled exposure value so that the most important luminance range of the scene is expressed in as wide dynamic range of the film as possible. Therefore, the density range of an image recorded on the positive film is constant in most cases, and it is not necessary for controlling scanning conditions for each image. Whereas, as for a negative film, since the latitude is broad, the film can record an image in a very wide luminous exposure range. Accordingly, even though the luminous exposure is too much or not enough for photographing a scene, it is possible for the negative film to record a primary luminance range of the scene using a part of the width of the dynamic range of the film. Therefore, when scanning a negative film, it is necessary to properly determine the density range expressing the luminance range of the photographed scene out of the entire density range (i.e., between the highest density and the lowest density) of the film. Thus, the following explanation deals with a case of scanning a negative film.

Figure 3:
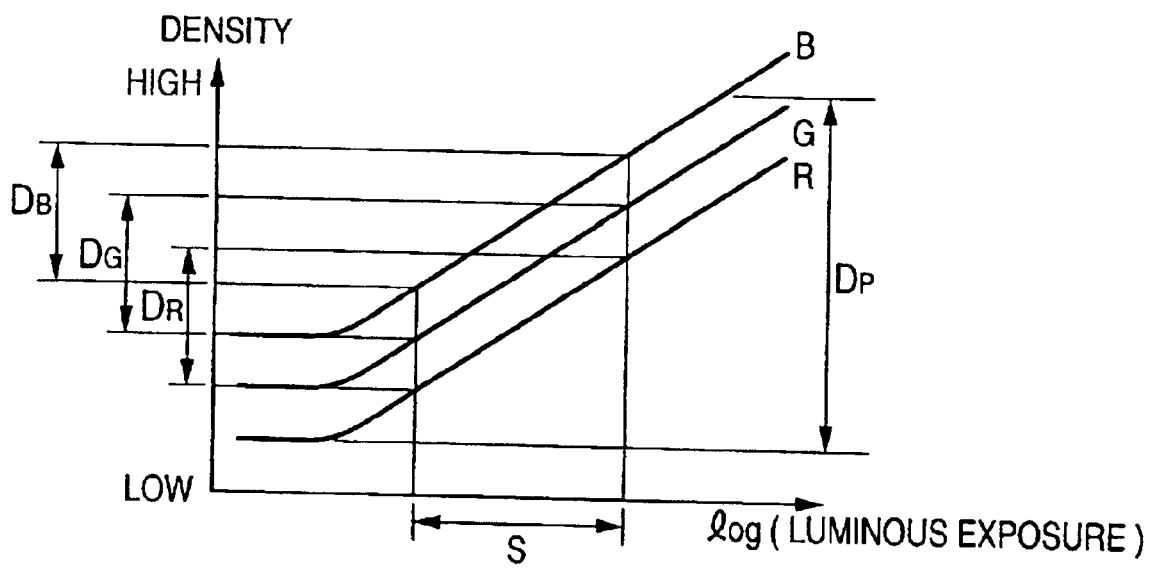
FIG. 3 is a graph showing sensitometric characteristic lines of a negative color film obtained in pre-scanning operation.

First, processing of the pre-scanning is explained with reference to FIGS. 3 to 5. FIG. 3 is a graph showing sensitometric characteristic lines of a negative color film, obtained in the pre-scanning, corresponding to a luminance range S of a photographed scene are shown. The ordinate of the graph indicates optical density and the abscissa indicates the logarithm of luminous exposure applied to the film when photographing a scene. Note, if the density of the film is high (i.e., the luminous exposure was high), the signal level obtained in the pre-scanning is low, whereas if the density of the film is low (i.e., the luminous exposure was low), the signal level is high.

On a negative color film, in order to compensate for deviations of actual spectral absorption of coloring dye with respect to an ideal spectral absorption of imaginary coloring dye, orange masking is applied, generally. As a result, ranges of red (R), green (G) and blue (B) signal levels are shifted from each other. Therefore, density ranges $D_B$, $D_G$ and $D_R$ corresponding to the luminance range S of the scene are also shifted from each other, and conditions for the pre-scanning are predetermined so that the possible density range expressing any kinds of the photographed scenes, namely the entire density range of one image can be expressed within the density range $D_P$ in the pre-scanning.

Figure 4A:
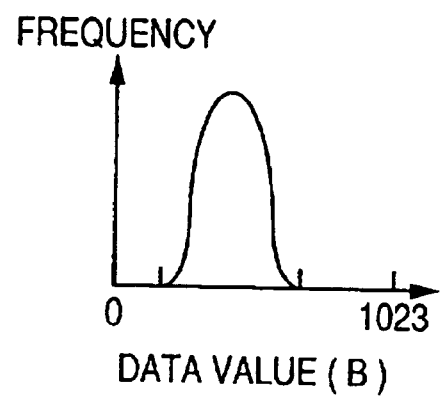
FIGS. 4A to 4C are histograms of output data from an A/D converter obtained in the pre-scanning operation.
Figure 4B:
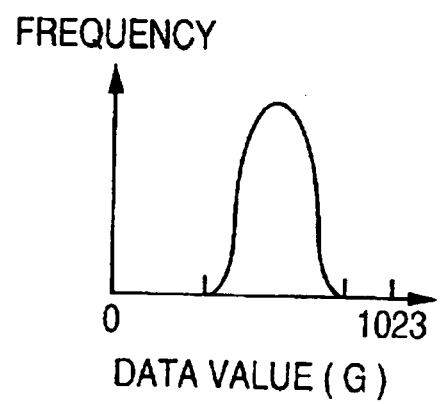
Figure 4C:
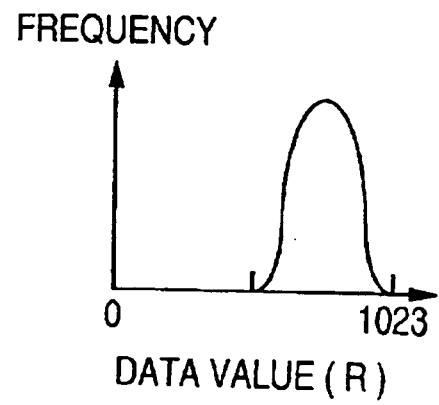

FIGS. 4A to 4C are histograms of image data values outputted from the A/D converter 9 obtained by scanning the original image 3 under the aforesaid conditions for pre-scanning. In FIGS. 4A to 4C, frequencies of the digital values between 0 and 1023 of B, G and R data are shown, respectively, when the resolution of the A/D converter 9 is 10 bits, for instance. FIG. 4A shows the histogram of the B data, FIG. 4B shows the histogram of the G data, and FIG. 4C shows the histogram of the R data. These histograms are of the data values of a negative image, and the frequencies of the respective B, G and R data are concentrated within some data values, where the data values on which the frequencies of the respective B, G and R data concentrate are shifted from each other due to the orange masking.

Figure 5A:
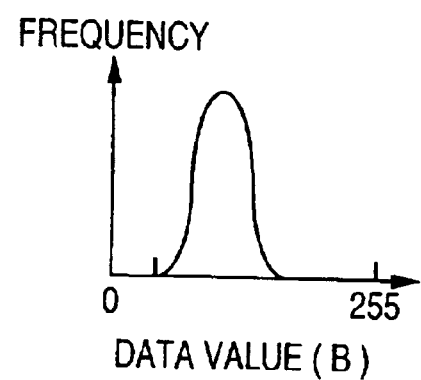
FIGS. 5A to 5C are histograms of output data from a digital signal converter obtained in the pre-scanning operation.
Figure 5B:
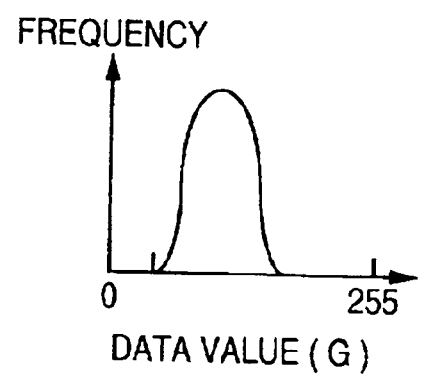
Figure 5C:
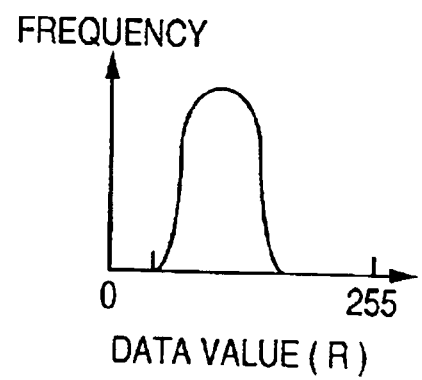

These data as shown in FIGS. 4A to 4C, are inputted into the LUT 10 where negative-positive conversion and compensation of the shift of data values of the B, G and R data due to the orange masking are performed. Histograms of data outputted from the LUT 10 are as shown in FIGS. 5A to 5C. These histograms show data values of the B, G and R data of a positive image, and by analyzing these histograms, conditions for main scanning are determined.

Figure 6:
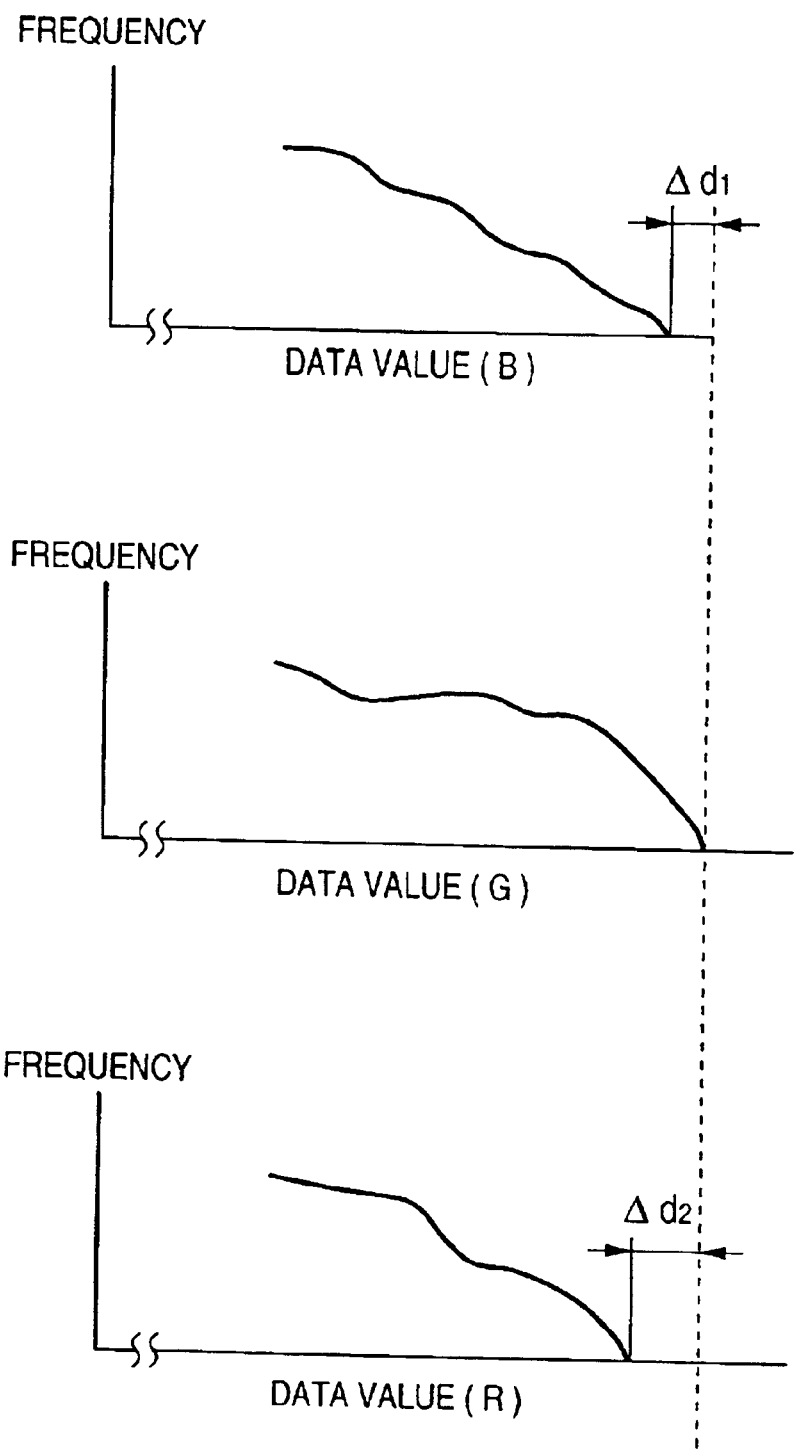
FIG. 6 is an enlarged view of right edges of histograms of an image, photographed under daylight, which includes a white portion.

Next, processing for determining the conditions for the main scanning on the basis of the right limit of the luminance of a scene in FIG. 3, namely, the brightest point of the scene, by analyzing the histograms obtained in the pre-scanning is explained. Upon determining the conditions for the main scanning, it is necessary to determine the conditions so as to fit the characteristics of the scene. FIGS. 6 to 8 are enlarged view of the right end portion of the distribution of the histograms, as shown in FIGS. 5A to 5C, obtained by scanning images having different characteristics in the pre-scanning operation. FIG. 6 shows right edges of histograms of an image, photographed under daylight, which includes a white portion; FIG. 7 shows right edges of histograms of an image, photographed under daylight, which does not include a white portion; and FIG. 8 shows right edges of histograms of an image which is photographed under fluorescent light.

The data values of the B, G and R data at the brightest points in the respective images are different from each other as shown by the histograms of the three images shown in FIGS. 6 to 8. The greatest data value for each of the B, G and R data of the image including the white portion as shown in FIG. 6 is almost the same for R, G and B data because the white portion exist in the image, and there is little differences $\Delta d_1$ and $\Delta d_2$ between the respective greatest data values of the B, G and R data. Accordingly, the main scanning conditions, such as intensity of the light source 1, a filter selected in the filter unit 4, and a gain used in the analog signal processing unit 8, are set so that each greatest data value for each of the B, G and R data is expressed by the possible maximum value, namely 255, in the main scanning operation. Note the conditions set in this case are common for the respective B, G and R data.

Referring to FIG. 7, since the image does not include a white portion, the greatest data value is determined for each of the primary colors (in this case, blue, green and red) or colors near the primary colors. Therefore, differences between the greatest data values for the respective B, G and R data are usually considerably large. For preserving the colors of the image under this condition, it is necessary to keep the differences $\Delta d_3$ and $\Delta d_4$ between the greatest data values of the R, G and B data. Accordingly, the conditions for the main scanning operation are determined on the basis of the largest data value among the G, B and R data so that the largest value is expressed by the possible maximum value, namely 255, in the main scanning operation. Further, in this case, it is necessary to set the conditions common for the respective B, G and R data.

Thus, upon scanning images having characteristics as shown in FIGS. 6 and 7, the same scanning conditions are to be set for the R. G and B data when performing main scanning operation.

FIG. 8 shows a part of the histogram of the image which is photographed under the fluorescent light, and it is necessary to correct the G data which is enhanced due to the characteristics of the fluorescent light. The differences $\Delta d_5$ and $\Delta d_6$ between the greatest data values for the respective R, G and B data are between the differences $\Delta d_1$ and $\Delta d_2$ shown in FIG. 6 and the differences $\Delta d_3$ and $\Delta d_4$ shown in FIG. 7, and the G data has the greatest data value among the R, G and B data. In this case, in order to compensate the differences of the colors caused by fluorescent light, it is necessary to determine the conditions for main scanning operation so that the greatest data value for each G, B and R data is expressed by the possible maximum value, namely 255, in the main scanning operation.

As a whole, it is possible to determine whether to set the identical conditions used in main scanning operation for all the R, G and B data or to set the different conditions for the respective R, G and B data on the basis of the differences between the greatest data values for the respective R, G and B data. More specifically, if the differences between the greatest data values for the respective R, G and B data are either very small or very large, the same conditions are set for the R, G and B data, otherwise, the different conditions are set for the respective R, G and B data.

Figure 9:
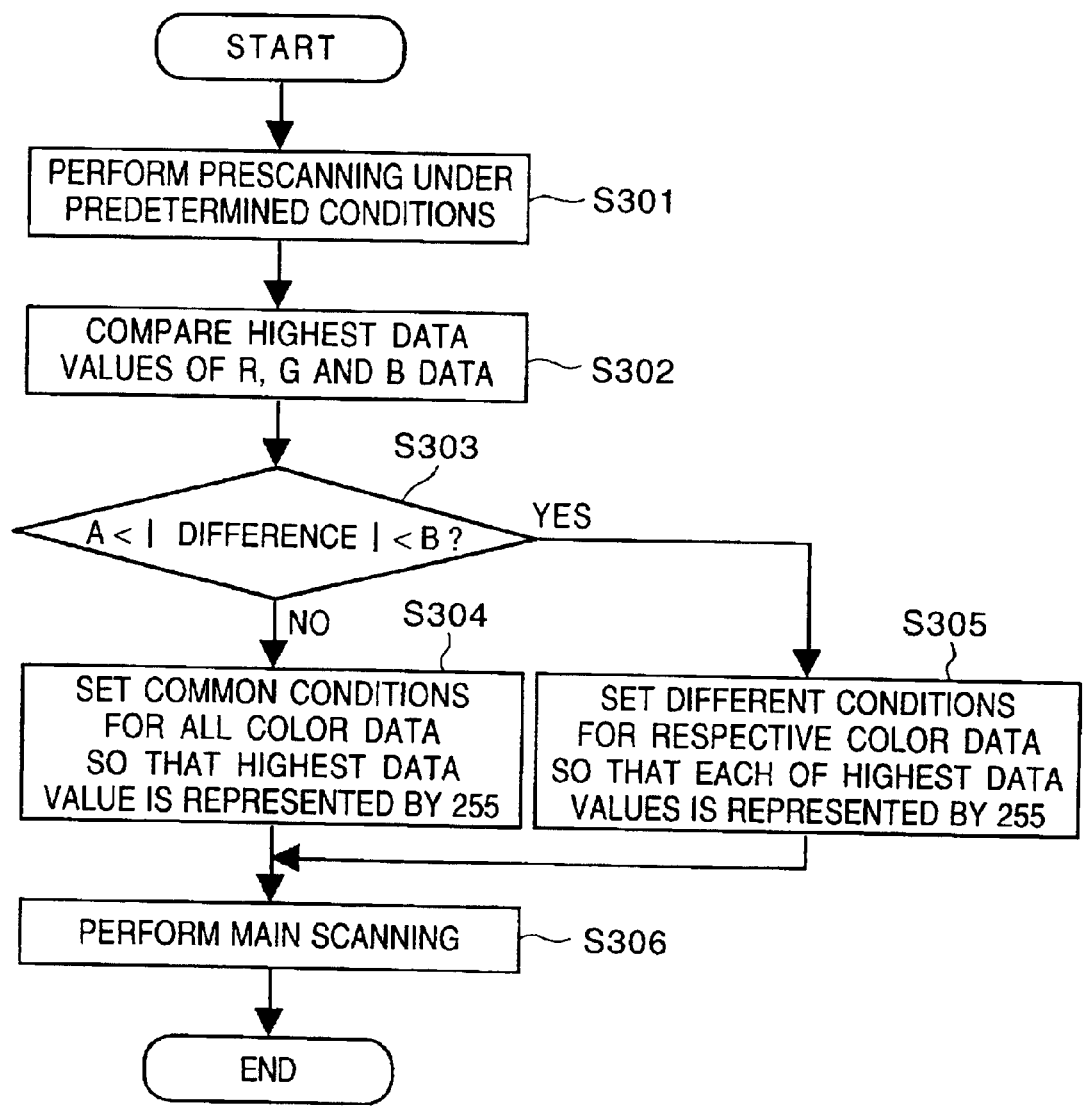
FIG. 9 is a flowchart briefly showing processing for determining conditions used in main scanning operation according to the first embodiment of the present invention.

FIG. 9 is a flowchart briefly showing processing for determining conditions used in the main scanning operation according to the first embodiment of the present invention. First in step S301, pre-scanning operation is performed under the predetermined conditions, as described above, so that the entire density range of the film can be represented by image signals which are within a predetermined signal level range. In step S302, the greatest data values for the respective R, G and B data are compared using histograms of the pre-scan images (positive image). Then, in step S303, whether or not the differences between the greatest data values for the respective R, G and B data are in range between a first threshold A and a second threshold B is checked. If yes, then the process proceeds to step S305, whereas if it is not, then the process proceeds to step S304.

Step S304 is a process for a case where either a pure white or a primary color exists in the image, and common conditions for main scanning operation are set for all the R, G and B data so that the greatest data value of the R, G and B data is represented by the possible maximum data value (e.g., 255) as a result of the main scanning operation. Step S305 is a process for a case where the differences between the greatest data values for the respective R, G and B data of an image have to be compensated, and the conditions for the main scanning are set so that the greatest data value for each R, G and G data is represented by the possible maximum data value (e.g., 255) as a result of the main scanning operation.

Then, under the conditions set in either step S304 or S305, main scanning operation is performed in step S306.

Next, processing of the main scanning operation performed under the conditions set as described above are explained with reference to FIGS. 10 to 12C.

Figure 10:
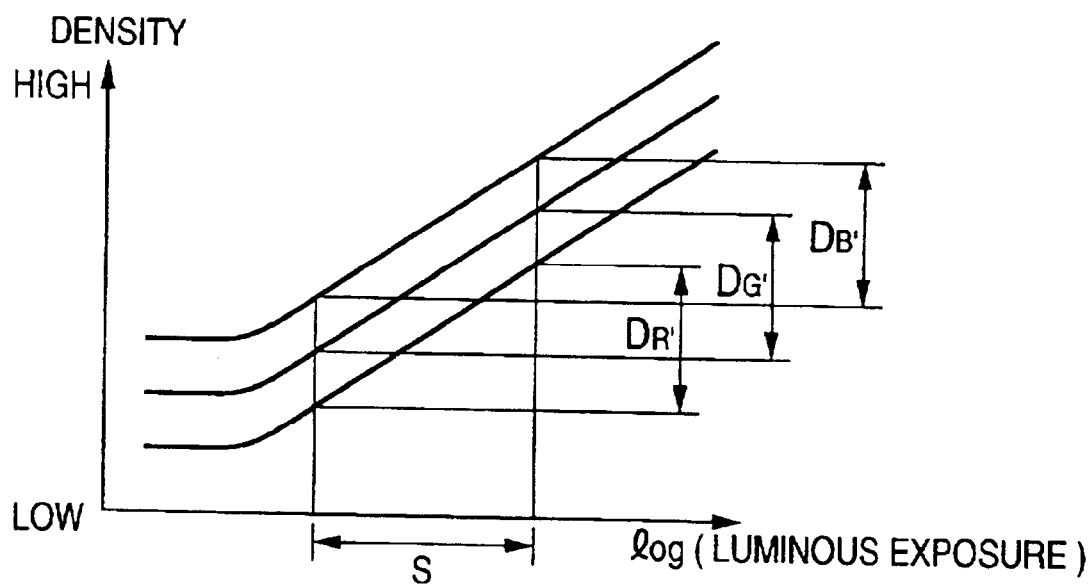
FIG. 10 is a graph showing sensitometric characteristic lines of a negative color film obtained in main scanning operation.

FIG. 10 is a graph showing how the obtained density ranges corresponding to the luminance range S of a scene in the main scanning processing are determined. As shown in FIG. 10, obtained density ranges $D_B'$, $D_G'$ and $D_R'$ are set for respective B, G and R data for extracting signals representing a density range of the film corresponding to the luminance range S of the photographed scene. Note, different methods are used for adjusting the density levels corresponding to the densities at the upper limit of the luminance range S and for adjusting the density levels corresponding to the densities at the lower limit of the luminance range S, as described below.

Regarding the signal levels (voltages) at the left (lower) end of the luminance range S of the scene in FIG. 10, namely, of the darkest limit of the scene, depending upon the conditions for the main scanning operation set in either step S304 or S305 in FIG. 9, they are controlled so that at least one or all of the signal levels are outputted from the analog signal processing unit 8 in voltages equivalent to the maximum level of digital image signals, e.g., 1023, by adjusting the intensity of the light source 1, a filter selected in the filter unit 4, and a gain used in the analog signal processing unit 8. FIGS. 11A to 11C are histograms showing the digital image signals obtained under the conditions set in step S305 in FIG. 9, and the maximum data values for the respective R, G and B data are 1023.

Figure 12A:
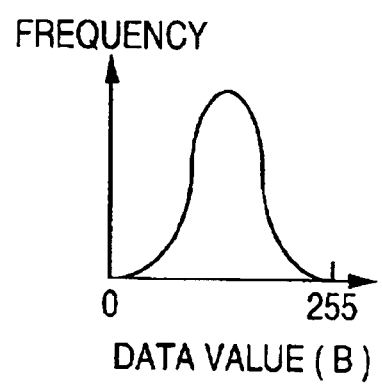
FIGS. 12A to 12C are histograms of output data from the digital signal converter obtained in the main scanning operation.
Figure 12B:
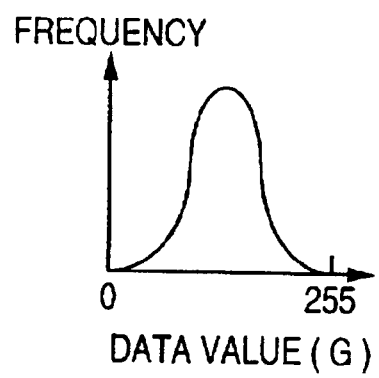
Figure 12C:
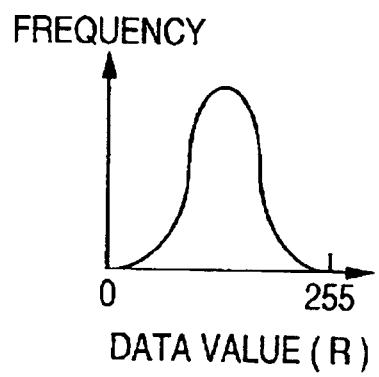

Regarding the signal levels (voltages) at the right (upper) end of the luminance range S of the scene in FIG. 10, namely, the brightest limit of the scene, they are LB, LG and LR, and not zero as shown in FIG. 11. The data having values between LB, LG and LR and 1023 are performed with negative-to-positive conversion, further mapped to eight-bit data by the LUT 10, thereby all the data having values between LB, LG and LR and 1023 are converted to eight-bit data having data values between 0 and 255. Accordingly, the luminance range S of the scene is expressed by eight-bit data having data values between 0 and 255. FIGS. 12A to 12C are histograms showing the resultant data of conversion.

Note, when processing an image recorded on a positive film, the signal levels at the right (upper) end of the luminance range S of the scene are adjusted so as to have the voltage equivalent to the digital signal level of 1023, and the signal levels of the left end of the luminance range S of the scenes are eventually mapped to 0 level of eight-bit data.

According to the first embodiment as described above, by analyzing the edge portion of the histograms of a pre-scan image, it is possible to easily and automatically determine conditions to be used when scanning a film. Especially, it is possible to automatically determine whether it is unnecessary to compensate the bias of colors of an image because the bias is due to the original colors of an object, or it is necessary to compensate the bias of the colors of an image because the bias is due to, e.g., the light source used when recording the image, thereby automatically setting the conditions used for scanning the image.

Second Embodiment

Below, processing for setting conditions for main scanning operation according to a second embodiment is explained. An image scanning system used in the second embodiment has the same configuration as that shown in FIG. 1, therefore, the explanation of it is omitted. In the second embodiment, in addition to the determination processing of conditions for main scanning operation as described in the first embodiment, image sensing information recorded on a film is read by the magnetic head 16, shown in FIG. 1, and interpreted by the image sensing information decoder 25, thereby whether or not a scene is photographed under an artificial light source, such as a tungsten light and a fluorescent light, is determined. The determination is performed by the CPU 23. Further, whether or not the light source used for photographing the image is an artificial light source, such as the tungsten light and the fluorescent light, is also determined by the CPU 23 in the second embodiment by analyzing the histograms of the pre-scan image, as described in the first embodiment.

Figure 13:
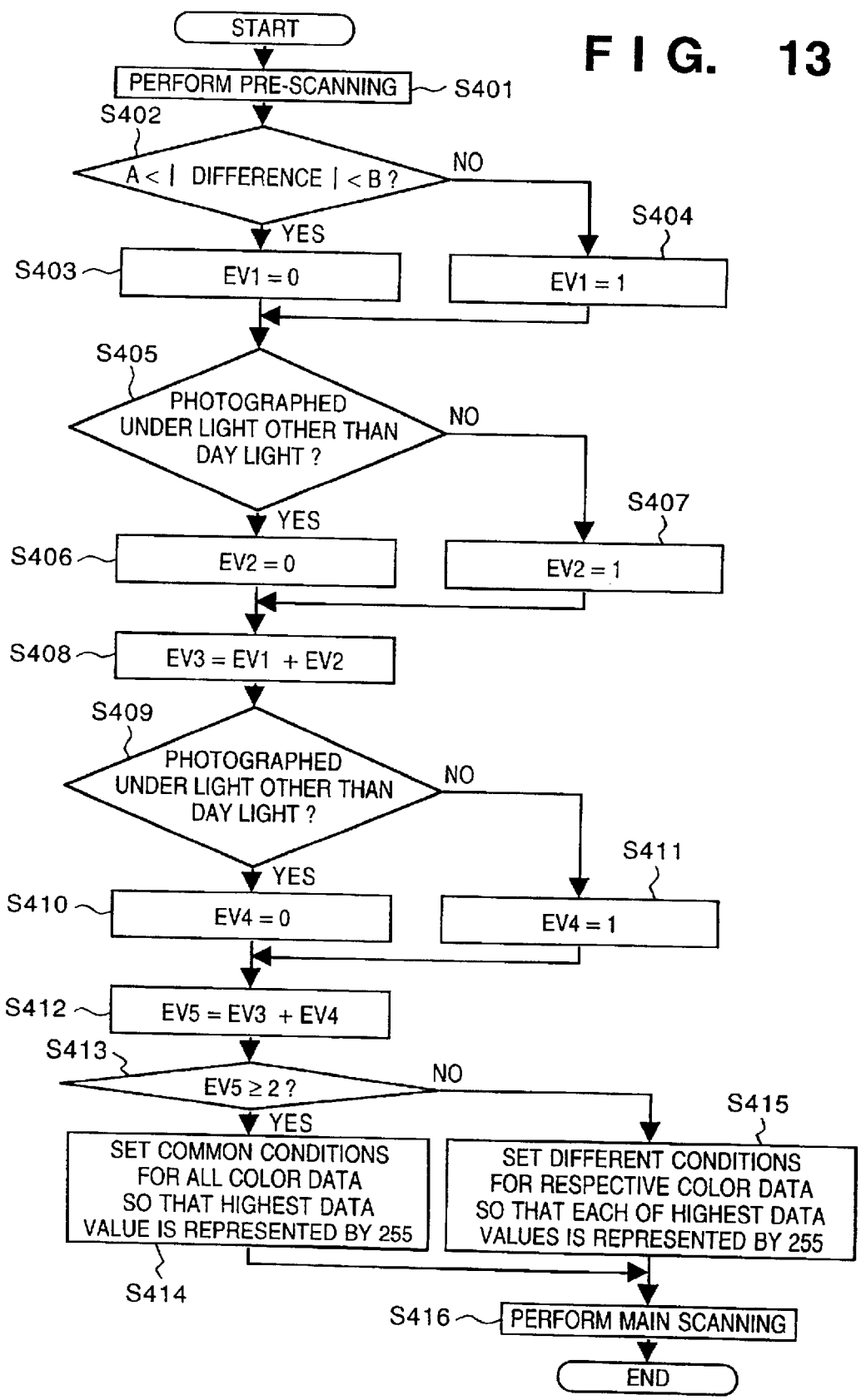
FIG. 13 is a flowchart briefly showing processing for determining conditions used in main scanning operation according to a second embodiment of the present invention.

The determination processing of the conditions for the main scanning operation in the second embodiment is explained with reference to a flowchart shown in FIG. 13. First, in step S401, pre-scanning is performed and histograms of respective R, G and B data, as shown in FIGS. 4A to 4C are obtained. Then in step S402, the greatest data values for the respective R, G and B data in the histograms of the pre-scan image (positive image) are compared, and whether or not the respective differences between the greatest data values are between the first threshold A and the second threshold B is determined. If yes, then the process proceeds to step S403, whereas if no, then the process proceeds to step S404. In step S403, an evaluation value EV1 is set to 0, whereas in step S404, the evaluation value EV1 is set to 1.

Next in step S405, on the basis of the output data of the image sensing information decoder 25, whether or not the light source used for photographing the image is daylight is determined. When it is determined that the image is photographed under light other than the daylight, then the process proceeds to step S406, and otherwise, the process proceeds to step S407. In step S406, an evaluation value EV2 is set to 0, whereas, in step S407, the evaluation value EV2 is set to 1.

In step S408, the evaluation value EV1 set in either step S403 or S404 is added to the evaluation value EV2 set in either step S406 or S407 and an added value EV3 is obtained.

In step S409, the greatest data values for the respective R, G and B data in the histograms of the pre-scan image (positive image) are compared to each other. At this time, whether the relationship of the greatest data values for the respective R, G and B data is R>G>B (tungsten light) or whether the data value of the G data has the largest value (fluorescent light) is checked. If characteristics of the greatest data values for the respective R, G and B signals are either of the above, the process proceeds to step S410, whereas if not, then the process proceeds to step S411. In step S410, an evaluation value EV4 is set to 0, whereas in step S411, the evaluation value is set to 1.

Next in step S412, the value EV3 which is obtained in step S408 is added to the evaluation value EV4 obtained in either step S410 or S411. Then, in step S413, the sum EV5 is compared to 2. If the sum EV5 is greater or equal to 2, then the process proceeds to step S414, whereas if the sum is less than 2, then the process proceeds to step S415.

Step S414 is a process for a case where either a pure white or a primary color exists in the image which is sensed under daylight, and common conditions for main scanning operation are set for all the R, G and B data so that the greatest data value of the R, G and B data is represented by the possible maximum data value (e.g., 255) as a result of the main scanning operation.

Step S415 is a process for a case where the differences between the greatest data values for the respective R, G and B data of an image, which is sensed under light other then daylight, have to be compensated, and the conditions for the main scanning are set so that each of the greatest data values for the respective R, G and G data is represented by the possible maximum data value (e.g., 255) as a result of the main scanning operation. Thereafter, in step S416, under the conditions set in either step S414 or S415, the main scanning is performed.

According to the second embodiment as described above, in addition to the same advantages as those of the first embodiment, since the conditions for main scanning operation are determined on the basis of a plurality of determination factors, therefore, even though one determination factor is improper, it is possible to properly determine the conditions.

Note, the present invention is not limited to the film scanner, and can be applied to a system capable of separating image signals, obtained from light reflected by an original color image, into color components, for instance.

The present invention is not limited to the above embodiments and various changes and modifications can be made within the spirit and scope of the present invention. Therefore to apprise the public of the scope of the present invention, the following claims are made.

What is claimed is:

1. An image read method comprising:
   a pre-scanning step of pre-scanning a photographed image and outputting an image signal;
   a color separation step of separating the image signal obtained in said pre-scanning step into primary color component signals;
   a type determination step of determining a type of a light source which illuminated an object, in the photographed image, when it is photographed on the basis of signal levels of the color component signals obtained in said color separation step; and
   a condition determination step of determining scanning conditions for main scanning operation on the basis of the type of the light source determined in said type determination step.

2. The image read method according to claim 1 further comprising a detection step of detecting maximum values of the color component signals for respective colors obtained in said color separation step,
   wherein, in said type determination step, the type of the light source is determined on the basis of the maximum values of the color component signals for the respective colors detected by said detection step.

3. The image read method according to claim 2, wherein in said detection step, the maximum values of the color component signals for the respective colors are detected by generating histograms of signal level of the color component signals for the respective colors and analyzing the histograms.

4. The image read method according to claim 2, wherein said type determination step comprises:
   a difference detection step of obtaining differences between the maximum values of the color component signals for the respective colors detected in said detection step;
   a first comparison step of comparing the differences obtained in said difference detection step with a first threshold; and
   a second comparison step of comparing the differences obtained in said difference detection step with a second threshold which is larger than the first threshold,
   and, in said type determination step, in a case where the differences obtained in said difference detection step are smaller than the first threshold or larger than the second threshold, the light source is determined to be a first type, otherwise, the light source is determined to be a second type.

5. The image read method according to claim 4, wherein, when the light source is determined to be the first type in said type determination step, then, in said condition determination step, same scanning conditions are determined for the respective colors, whereas, when the light source is determined to be the second type, then scanning conditions are independently determined for each of the respective colors.

6. The image read method according to claim 5, wherein, when the light source is determined to be the first type in said type determination step, then, in said condition determination step, the scanning conditions are determined so that the largest value among the signal levels of the color component signals is to be outputted as a possible maximum value of a digital signal, whereas, when the light source is determined to be the second type, then the scanning conditions are determined so that each of maximum values of the color component signals for the respective colors are to be outputted as a possible maximum value of a digital signal.

7. The image read method according to claim 1 further comprising an information read step of reading image recording information recorded on a medium carrying the photographed image,
   wherein, in said type determination step, the type of the light source is determined on the basis of signal levels of the color component signals obtained in said color separation step and the image recording information read in said information read step.

8. The image read method according to claim 7 further comprising a detection step of detecting maximum values of the color component signals for respective colors obtained in said color separation step, wherein said type determination step comprises:
   a difference detection step of obtaining differences between the maximum values of the color component signals for the respective colors detected in said detection step;
   a first comparison step of comparing the differences obtained in said difference detection step with a first threshold;
   a second comparison step of comparing the differences obtained in said difference detection step with a second threshold which is larger than the first threshold;

a pattern determination step of determining whether or not the characteristic of the differences obtained in said difference detection step matches a predetermined characteristic; and an information determination step of determining whether or not the image recording information read in said information read step indicates the second type, and wherein, in said type determination step, if two out of the following three conditions, 1) the differences obtained in said difference detection step are smaller than the first threshold or larger than the second threshold; 2) the characteristics of the difference does not match the predetermined characteristics in said pattern determination step; and 3) the image recording information does not indicates the second type in said information determination step, are satisfied, then the light source is determined to be a first type, otherwise, the light source is determined to be a second type.

9. The image read method according to claim 8, wherein the predetermined characteristic indicates that the light source is other than daylight.

10. The image read method according to claim 8, wherein, in a case where the light source is determined to be the first type in said type determination step, in said condition determination step, the same scanning conditions are determined for the respective colors, whereas, when the light source is determined to be the second type, then the scanning conditions are independently determined for each of the respective colors.

11. The image read method according to claim 10, wherein, when the light source is determined to be the first type in said type determination step, then, in said condition determination step, the scanning conditions are determined so that the largest value among the signal levels of the color component signals is to be outputted as a possible maximum value of a digital signal, whereas, when the light source is determined to be the second type, then the scanning conditions are determined so that each of maximum values of the color component signals for the respective colors are to be outputted as a possible maximum value of a digital signal.

12. The image read method according to claim 1, wherein the image signal to be separated into the color component signals in said color separation step is an image signal of a positive image.

13. The image read method according to claim 1, wherein the scanning conditions are conditions for adjusting signal levels of the image signal.

14. The image read method according to claim 13, wherein the scanning conditions designates intensity of light to be emitted from a light source for illuminating the original image.

15. The image read method according to claim 13, wherein the scanning conditions designates a gain to be used for amplifying the image signal.

16. The image read method according to claim 13, wherein the scanning conditions designates a table to be used for converting the image signal.

17. The image read method according to claim 16, wherein the image signal is a digital signal, and the table is used for converting the digital signal into a digital signal of another format.

18. An image read system comprising:
image read means for scanning a photographed image and outputting an image signal;
color separation means for separating the image signal obtained by said pre-scanning means into color component signals;

type determination means for determining a type of a light source which illuminated an object, in the photographed image, when it is photographed on the basis of signal levels of the color component signals obtained by said color separation means; and condition determination means for determining scanning conditions for main scanning operation on the basis of the type of the light source determined by said type determination means.

19. The image read system according to claim 18 further comprising detection means for detecting maximum values of the color component signals for respective colors obtained by said color separation means, wherein said type determination means determines the type of the light source on the basis of the maximum values of the color component signals for the respective colors detected by said detection means.

20. The image read system according to claim 19, wherein said detection means detects the maximum values of the color component signals for the respective colors by generating histograms of signal level of the color component signals for the respective colors and analyzing the histograms.

21. The image read system according to claim 19, wherein said type determination means comprises:

difference detection means for obtaining differences between the maximum values of the color component signals for the respective colors detected by said detection means;

first comparison means for comparing the differences obtained by said difference detection means with a first threshold; and second comparison means for comparing the differences obtained by said difference detection means with a second threshold which is larger than the first threshold, and, in a case where the differences obtained by said difference detection means are smaller than the first threshold or larger than the second threshold, said type determination means determines that the light source is a first type, otherwise, determines that the light source is a second type.

22. The image read system according to claim 21, wherein, when said type determination means determines that the light source is the first type, then said condition determination means determines same scanning conditions for the respective colors, whereas, when said type determination means determines that the light source is the second type, then said condition determination means determines scanning conditions independently for each of the respective colors.

23. The image read system according to claim 22, wherein, when said type determination means determines that the light source is the first type, then said condition determination means determines the scanning conditions so that the largest value among the signal levels of the color component signals is to be outputted as a possible maximum value of a digital signal, whereas, when said type determination means determines that the light source is the second type, then said condition determination means determines the scanning conditions so that each of maximum values of the color component signals for the respective colors are to be outputted as a possible maximum value of a digital signal.

24. The image read system according to claim 18 further comprising information read means for reading image recording information recorded on a medium carrying the photographed image, wherein said type determination means determines the type of the light source on the basis of signal levels of the color component signals obtained by said color separation means and the image recording information read by said information read means.

25. The image read system according to claim 24 further comprising a detection step of detecting maximum values of the color component signals for respective colors obtained in said color separation step, wherein said type determination means comprises:
difference detection means for obtaining differences between the maximum values of the color component signals for the respective colors detected by said detection means;
first comparison means for comparing the differences obtained by said difference detection means with a first threshold;
second comparison means for comparing the differences obtained by said difference detection means with a second threshold which is larger than the first threshold;
pattern determination means for determining whether or not the characteristic of the differences obtained by said difference detection means matches a predetermined characteristic; and
information determination means of determining whether or not the image recording information read by said information read means indicates the second type, and wherein if two out of the following three conditions, 1) the differences obtained by said difference detection means are smaller than the first threshold or larger than the second threshold; 2) the characteristics of the differences does not match the predetermined characteristics by said pattern determination means; and 3) the image recording information does not indicates the second type by said information determination means, are satisfied, then said type determination means determines that the light source is a first type, otherwise, the light source is determined to be a second type.

26. The image read system according to claim 25, wherein the predetermined characteristic indicates that the light source is other than daylight.

27. The image read system according to claim 25, wherein, in a case where said type determination means determines that the light source is the first type, said condition determination means determines the same scanning conditions for the respective colors, whereas, when said type determination means determines that the light source is the second type, then said condition determination means determines the scanning conditions independently for each of the respective colors.

28. The image read system according to claim 27, wherein, when said type determination means determines that the light source is the first type, then said condition determination means determines the scanning conditions so that the largest value among the signal levels of the color component signals is to be outputted as a possible maximum value of a digital signal, whereas, when said type determination means determines that the light source is the second type, then said condition determination means determines the scanning conditions so that each of maximum values of the color component signals for the respective colors are to be outputted as a possible maximum value of a digital signal.

29. The image read system according to claim 18, wherein the image signal to be separated into the color component signals by said color separation means is an image signal of a positive image.

30. The image read system according to claim 18, wherein the scanning conditions are conditions for adjusting signal levels of the image signal.

31. The image read system according to claim 30, wherein the scanning conditions designates intensity of light to be emitted from a light source for illuminating the original image.

32. The image read system according to claim 30, wherein the scanning conditions designates a gain to be used for amplifying the image signal.

33. The image read system according to claim 30, wherein the scanning conditions designates a table to be used for converting the image signal.

34. The image read system according to claim 33, wherein the image signal is a digital signal, and the table is used for converting the digital signal into a digital signal of another format.

* * * * *